(12) United States Patent
Pick et al.

(10) Patent No.: US 12,192,040 B1
(45) Date of Patent: Jan. 7, 2025

(54) LATTICE REDUCTION TRANSFORMATION MATRIX CALCULATION AND SIGNALING

(71) Applicant: QUALCOMM Incorporated, San Diego, CA (US)

(72) Inventors: Jacob Pick, Mevaseret Zion (IL); Shay Landis, Hod Hasharon (IL); Peer Berger, Hod Hasharon (IL); Tomer Geva, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 18/216,464

(22) Filed: Jun. 29, 2023

(51) Int. Cl.
*H04L 27/26* (2006.01)
*H04L 25/02* (2006.01)

(52) U.S. Cl.
CPC .... *H04L 27/26532* (2021.01); *H04L 25/0202* (2013.01)

(58) Field of Classification Search
CPC ............. H04L 27/26532; H04L 25/0202
USPC ........................................... 375/340
See application file for complete search history.

(56) References Cited

U.S. PATENT DOCUMENTS

2010/0208837 A1\* 8/2010 Vetter .................. H04L 5/0048
375/267
2020/0028617 A1\* 1/2020 Landis ................. H04L 1/0003

OTHER PUBLICATIONS

3GPP: "3rd Generation Partnership Project, Technical Specification Group Radio Access Network, NR, Physical Channels and Modulation (Release 17)", 3GPP TS 38.211, V17.4.0, Dec. 2022, pp. 1-132, Sections 6.4.1.4.2 and 6.4.1.4.3.

\* cited by examiner

*Primary Examiner* — Fitwi Y Hailegiorgis
(74) *Attorney, Agent, or Firm* — Dinsmore & Shohl LLP

(57) ABSTRACT

Certain aspects of the present disclosure provide techniques for wireless communications by an apparatus. Certain techniques include sending an indication that the apparatus is capable of supporting lattice reduction (LR) demodulation; receiving a first LR transformation matrix (to be used for demodulating a modulated signal); and receiving the modulated signal.

30 Claims, 10 Drawing Sheets

LATTICE REDUCTION TRANSFORMATION MATRIX CALCULATION AND SIGNALING

INTRODUCTION

Field of the Disclosure

Aspects of the present disclosure relate to wireless communications, and more particularly, to techniques for demodulation.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

In some aspects, modulated signals may be demodulated based on a combination of lattice reduction (LR) demodulation and per-stream recursive demapping (PSRD), which may improve the PSRD performance when channel quality is above a threshold (e.g., high signal to noise ratio (SNR)), while preserving similar performance to PSRD when signal quality is below a threshold (e.g., low SNR).

As part of LR based techniques, a channel estimate procedure is performed to determine a matrix H for a communication channel (e.g., corresponding to a set of resource elements (REs) over which one or more beamformed transmissions are communicated) between a network entity and a user equipment (UE). The matrix H corresponds to the matrix representation of the channel. The matrix H is used to calculate a transformation matrix T to the lattice domain (T also being referred to as an LR transformation matrix). The transformation matrix T may then be used to perform LR based demodulation techniques for modulated signals communicated over the channel between the network entity and the UE.

A technical problem arises in that calculation of LR transformation matrices is complex, taking compute cycles and power to perform the calculations. For example, performing calculation of LR transformation matrices at a UE increases the compute complexity and energy consumption at the UE. Accordingly, certain aspects herein provide a technical solution to the technical problem, by providing techniques for calculation of LR transformation matrices to be offloaded from the UE.

In certain aspects, a network entity (e.g., a BS) is configured to calculate one or more LR transformation matrices for a UE. For example, the network entity may perform a channel estimate procedure on a communication channel to determine (e.g., estimate) an LR transformation matrix for the UE to use for demodulating modulated signals sent to the UE on the communication channel. The network entity may send the LR transformation matrix to the UE, which the UE may then use for demodulating signals. The technical effect of the network entity calculating and sending the LR transformation matrix to the UE, is that the UE does not have to calculate the LR transformation matrix itself, thereby reducing energy consumption at the UE, and reducing compute cycles used for demodulating signals. Further, the UE can perform LR based demodulation techniques, thereby improving demodulation performance at the UE.

One aspect provides a method for wireless communications by an apparatus. The method includes sending an indication that the apparatus is capable of supporting lattice reduction (LR) demodulation; receiving a first LR transformation matrix (to be used for demodulating a modulated signal); and receiving the modulated signal.

Another aspect provides a method for wireless communications by an apparatus. The method includes receiving an indication that a UE is capable of supporting LR demodulation; sending a first LR transformation matrix (to be used for demodulating a modulated signal); and sending the modulated signal.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
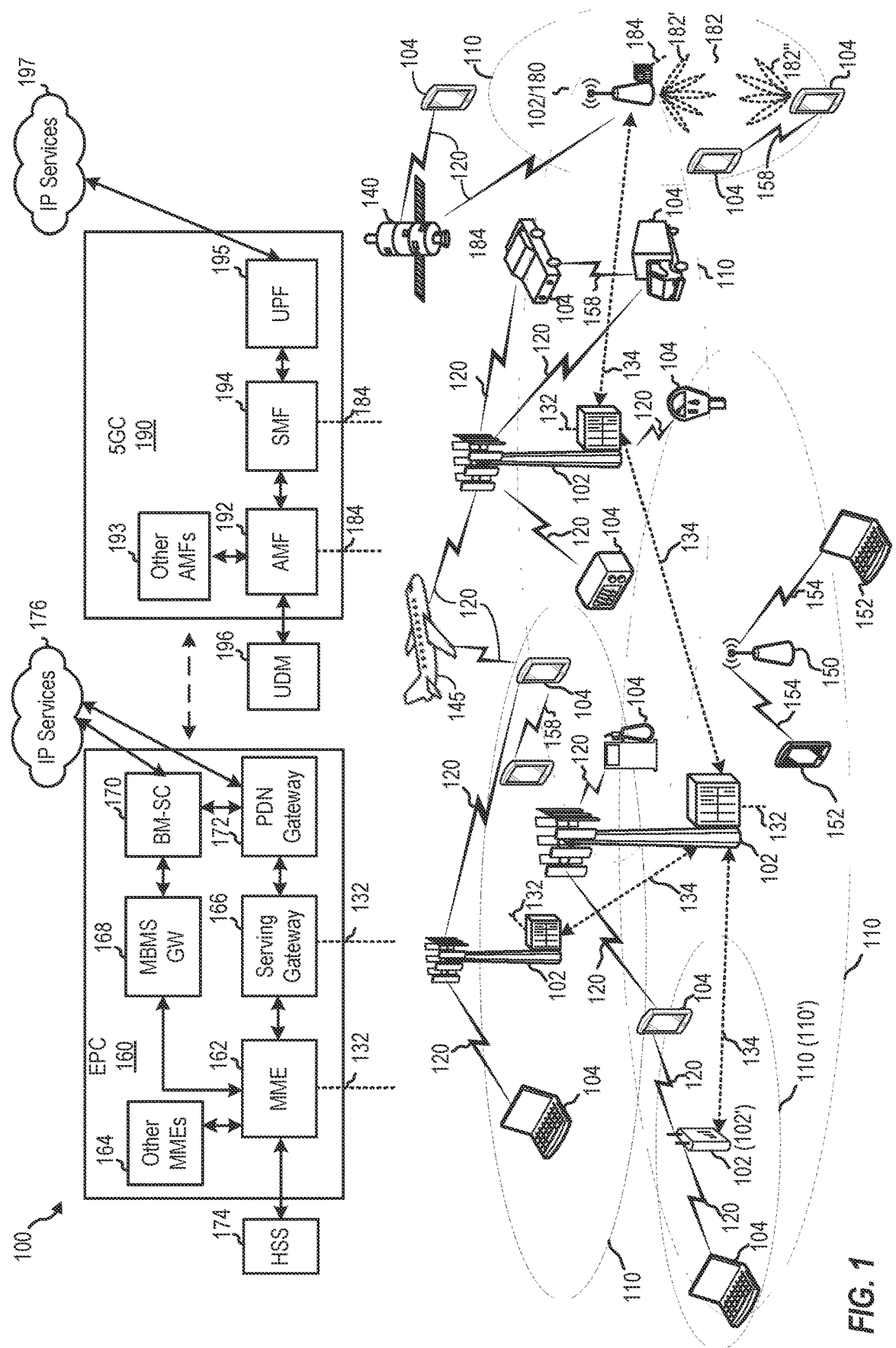
FIG. 1 depicts an example wireless communications network.

Aspects of the present disclosure provide apparatuses, methods, processing systems, and computer-readable mediums for communication of lattice reduction (LR) transformation matrix information.

Wireless communication apparatuses may be configured to communicate (e.g., send and/or receive) signals, such as using multiple-input and multiple-output (MIMO) antenna technology. For example, a network entity (e.g., a base station (BS)) may be configured to modulate a carrier signal with a modulation signal representing data to generate a modulated signal. The network entity may send the modulated signal as one or more beamformed transmissions to a user equipment (UE). The UE may receive the modulated signal and attempt to demodulate (also referred to as detect) the modulated signal to extract the data from the modulated signal.

Different methods for demodulating signals (e.g., signals transmitted and/or received using MIMO antenna technology) may have different complexity and accuracy. For example, linear detectors using a zero-forcing (ZF) or a minimum mean squared error (MMSE) algorithm may have a simpler design, but a lower accuracy as compared with near maximum likelihood (near ML) demapping methods such as per-stream recursive demapping (PSRD) methods. In some aspects, demodulation techniques such as MMSE, ZF, and PSRD can be improved by combining the demodulation technique with LR based demodulation techniques. For example, in some aspects, modulated signals may be demodulated based on a combination of LR and PSRD, which may improve the PSRD performance when channel quality is above a threshold (e.g., high signal to noise ratio (SNR)), while preserving similar performance to PSRD when signal quality is below a threshold (e.g., low SNR).

LR based demodulation techniques are further useful for demodulating signals communicated in sub-THz frequency channels (e.g., signal communicated on a carrier frequency that is less than 1 THz). For example, channel conditions on a sub-THz frequency channel may remain static for a long period of time, without Doppler spreading effects, leading to a steep block-error rate (BLER) curve. Therefore, the BLER target for demodulation may be set low, and LR based demodulation techniques help achieve the low BLER targets.

As part of LR based techniques, a channel estimate procedure is performed to determine a matrix H for a communication channel (e.g., corresponding to a set of resource elements (REs) over which one or more beamformed transmissions are communicated) between the network entity and the UE. The matrix H corresponds to the matrix representation of the channel. The matrix H is used to calculate a transformation matrix T to the lattice domain (T also being referred to as an LR transformation matrix). The transformation matrix T may then be used to perform LR based demodulation techniques for modulated signals communicated over the channel between the network entity and the UE.

A technical problem arises in that calculation of LR transformation matrices is complex, taking compute cycles and power to perform the calculations. For example, performing calculation of LR transformation matrices at a UE increases the compute complexity and energy consumption at the UE. Accordingly, certain aspects herein provide a technical solution to the technical problem, by providing techniques for calculation of LR transformation matrices to be offloaded from the UE.

In certain aspects, a network entity (e.g., a BS) is configured to calculate one or more LR transformation matrices for a UE. For example, the network entity may perform a channel estimate procedure on a communication channel to determine (e.g., estimate) an LR transformation matrix for the UE to use for demodulating modulated signals sent to the UE on the communication channel. The network entity may send the LR transformation matrix to the UE, which the UE may then use for demodulating signals. The technical effect of the network entity calculating and sending the LR transformation matrix to the UE, is that the UE does not have to calculate the LR transformation matrix itself, thereby reducing energy consumption at the UE, and reducing compute cycles used for demodulating signals. Further, the UE can perform LR based demodulation techniques, thereby improving demodulation performance at the UE.

In certain additional aspects, the network entity is configured to calculate multiple LR transformation matrices for the UE, across different frequencies. The network entity further sends the multiple LR transformation matrices to the UE, such as along with an indication of the frequency range to which each LR transformation matrix applies. The technical effect of the network entity calculating different LR transformation matrices for different frequency ranges, such as opposed to one LR transformation matrix across an entire channel, is that the LR transformation matrix for a particular frequency range may be a more accurate representation of the channel conditions of the particular frequency range. Accordingly, the UE may use a more accurate LR transformation matrix for performing demodulation for a given frequency range, thereby improving demodulation performance at the UE.

In certain additional aspects, the network entity is configured to calculate updated LR transformation matrices for the UE, such as at different time periods. For example, for a given channel, and for a given time period, the network entity may perform an updated channel estimate procedure, and send an updated LR transformation matrix to the UE. The technical effect of the network entity calculating a updated LR transformation matrix for different time periods, such as opposed to the UE using a single LR transformation matrix across the different time periods, is that even as channel conditions change the updated LR transformation matrix for a particular channel and time period may be a more accurate representation of the channel conditions of the channel. Accordingly, the UE may use a more accurate LR transformation matrix for a given channel and time period, thereby improving demodulation performance at the UE.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
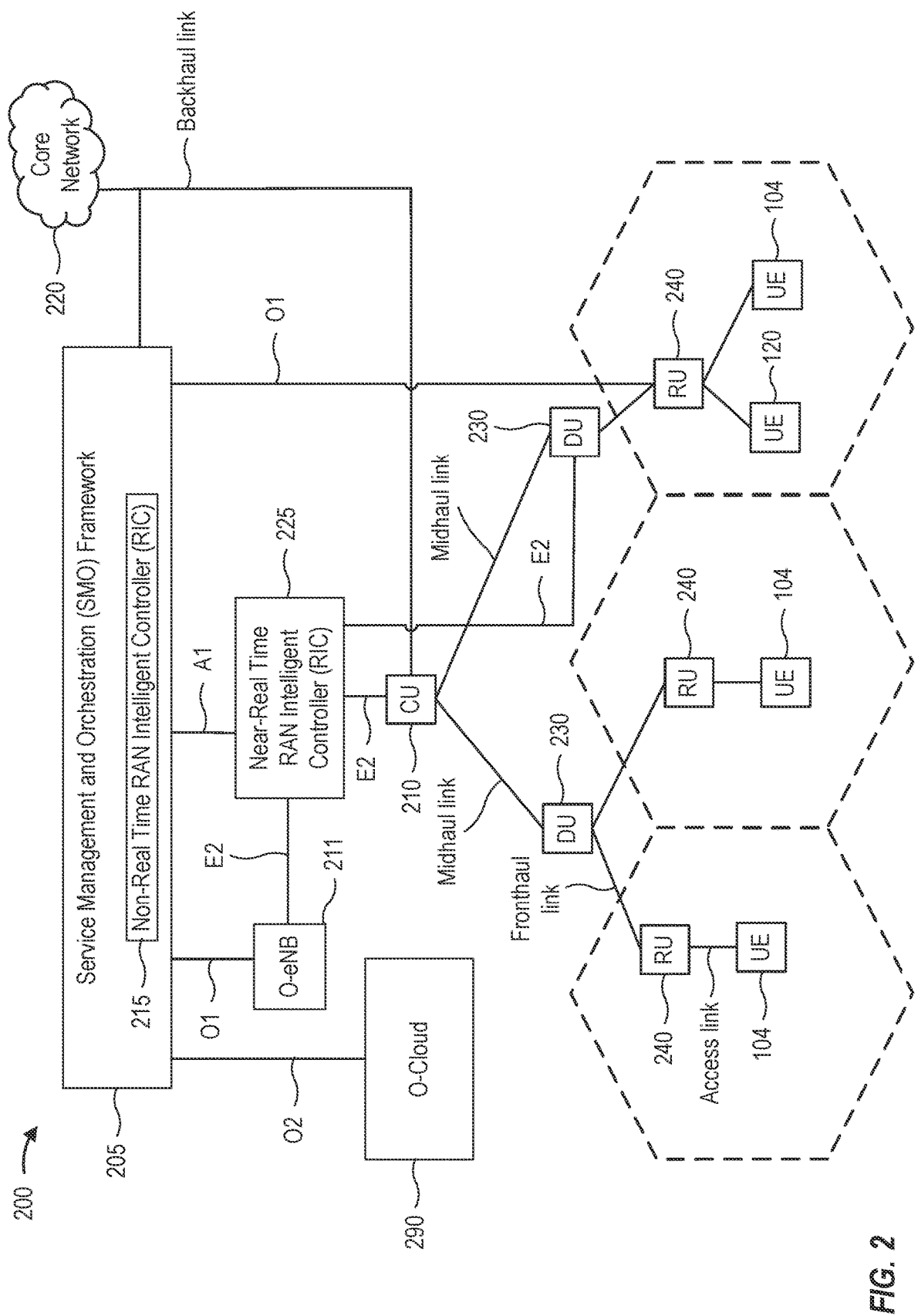
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410

MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
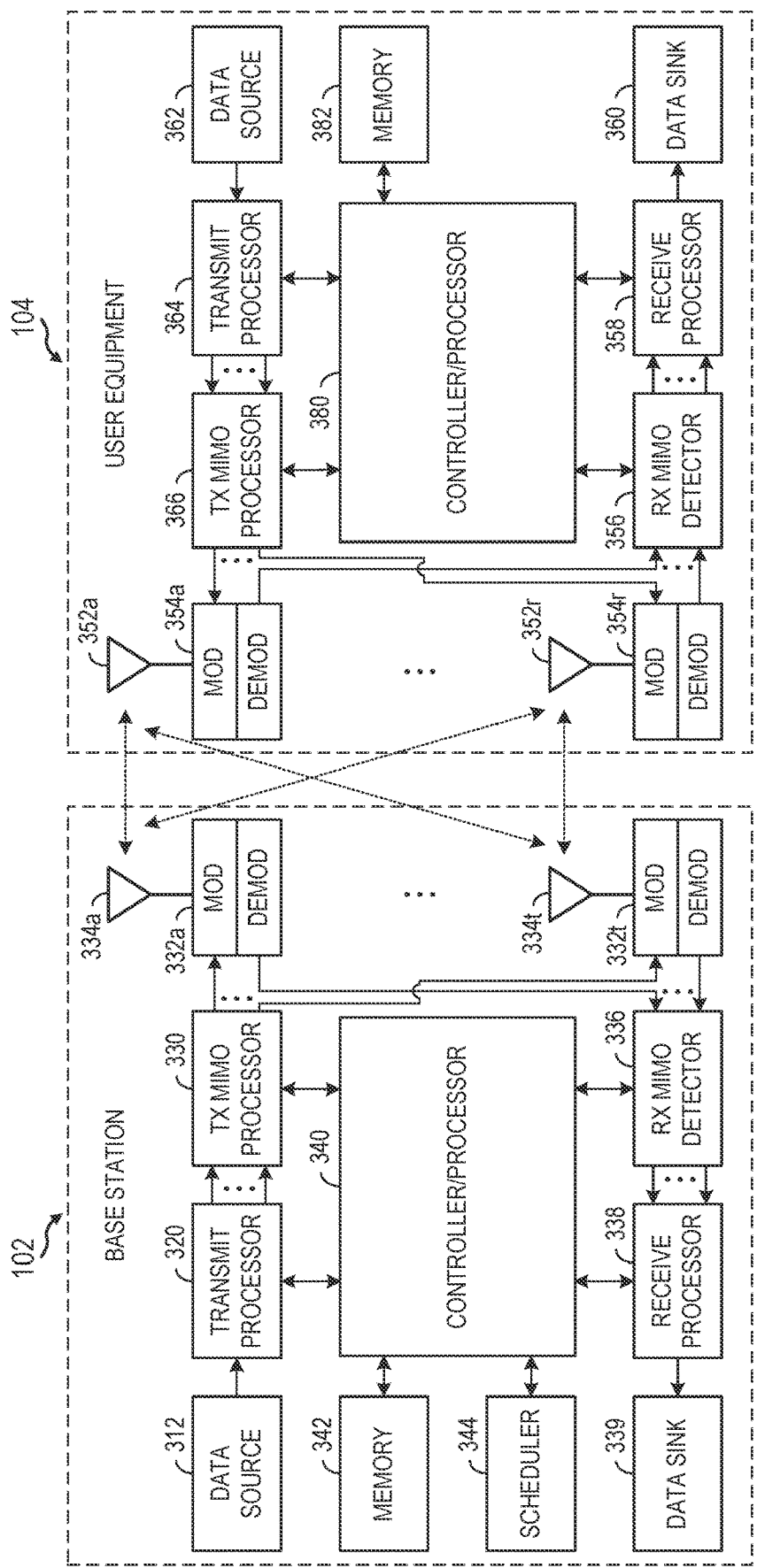
FIG. 3 depicts aspects of an example base station and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

RX MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a RX MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
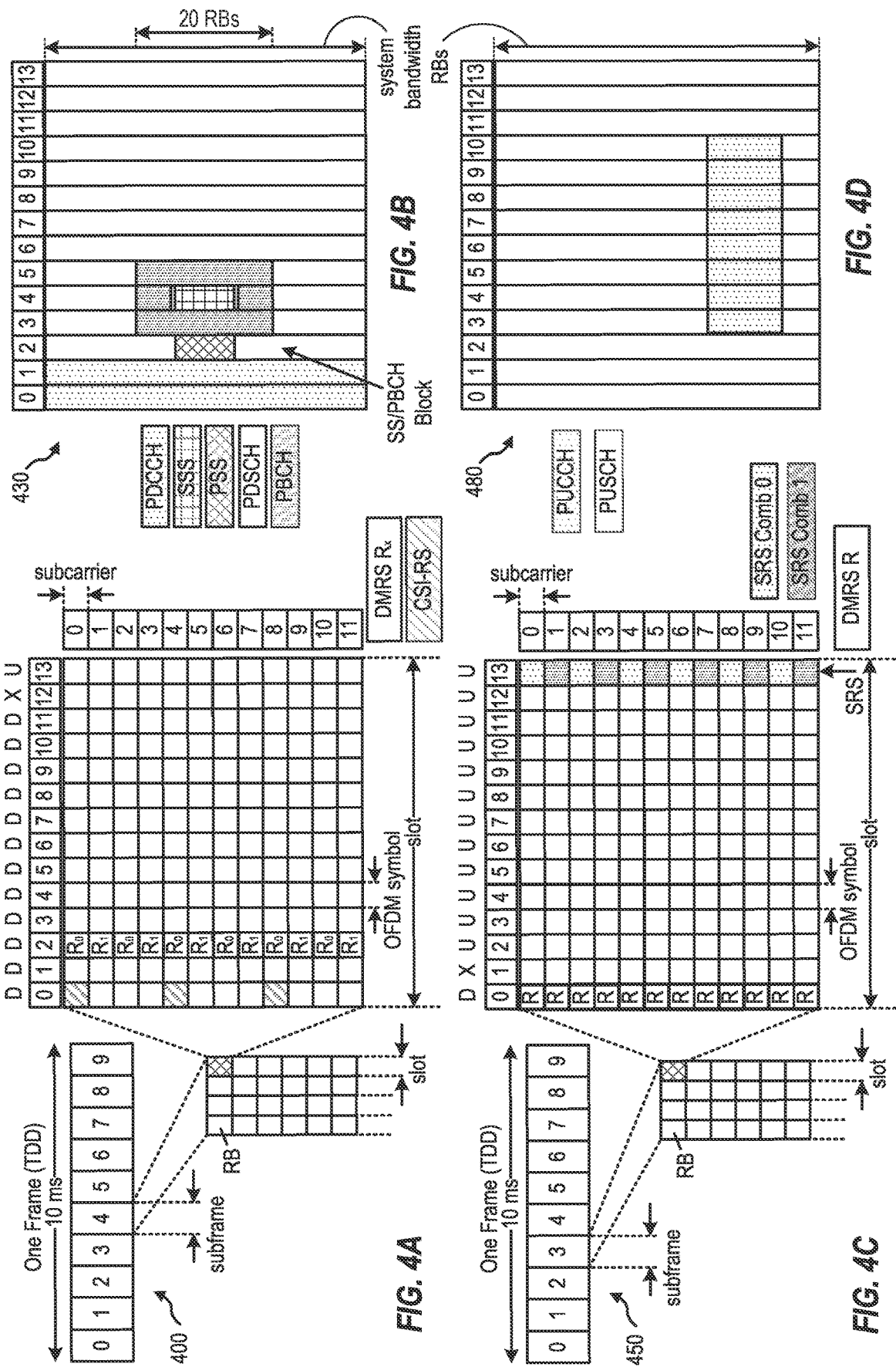
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Lattice Reduction Demodulation

Figure 5:
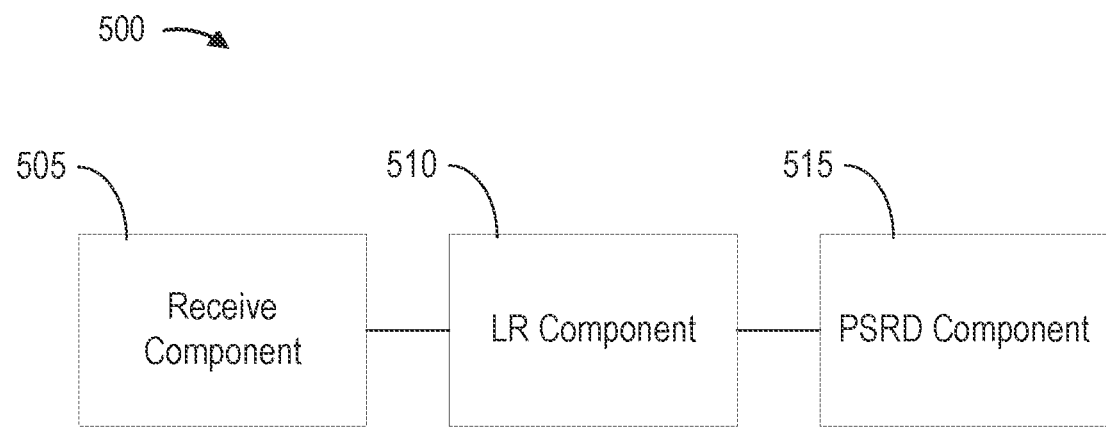
FIG. 5 is a diagram illustrating an example of a demodulator.

FIG. 5 is a diagram illustrating an example of a demodulator 500, in accordance with various aspects of the present disclosure. In some aspects, the demodulator 500 may be part of a wireless communications device, such as the UE 104 of FIGS. 1 and 3. For example, the demodulator 500 may be part of a transceiver 354, RX MIMO detector 356, and/or receive processor 358. Demodulator 500 includes a receive component 505, an LR component 510, and a PSRD component 515. One or more of components 505-515 of demodulator 500 may be part of transceiver 354, RX MIMO detector 356, and/or receive processor 358. Each of the components 505-515 of demodulator 500 may correspond to one or more hardware components specifically configured to carry out the stated processes/algorithm, implemented by one or more processors configured to perform the stated processes/algorithm, stored within a computer-readable medium for implementation by one or more processors, or some combination thereof.

Receive component 505 is configured to receive communications, such as from another wireless communications device (e.g., a network entity, such as BS 102 of FIGS. 1 and 3). For example, the network entity may send a communication to UE 104 in a communications channel (corresponding to a frequency range), which is received by receive component 505 of UE 104, such as using multiple antennas. The communication may be in the form of one or more beamformed transmissions on one or more REs scheduled for UE 104. In some aspects, the communication in the form of one or more beamformed transmissions may correspond to one or more modulated signals. The receive component 505 outputs a vector y that is a representation of the received signaling, including the one or more beamformed transmissions, as received over each of the multiple antennas on the communications channel such as on the one or more REs scheduled for UE 104. In certain aspects, the length of the vector y equals the number of antennas of UE 104 used to receive the signaling.

Based on a received signal model, the vector y can be represented as follows in equation (1):

$$\vec{y} = H\vec{x} + \vec{n} \quad (1)$$

In equation (1), H corresponds to a matrix representation of the communications channel, $\vec{x}$ is the vector representing symbols transmitted by the other wireless communications device over a number of spatial layers, and $\vec{n}$ is thermal noise across the communications channel. In certain aspects, H has a size equal to <the number of antennas used to receive the signaling> x <the number of spatial layers> (e.g., the number of beamformed transmissions).

In certain aspects, the received signal $\vec{y}=H\vec{x}+\vec{n}$ may be written as $\vec{y}=(HT)(T^{-1}\vec{x})+\vec{n}=\tilde{H}\vec{z}+\vec{n}$, where T is an LR transformation matrix, such as a Lenstra-Lenstra-Lovász (LLL) lattice basis reduction algorithm output transformation matrix, that may be a complex integer matrix where its inverse is also a complex integer matrix. In some aspects, the LLL lattice basis reduction algorithm may be a polynomial time lattice reduction algorithm where given a basis of $B=\{b_1, b_2, \ldots, b_d\}$ with n-dimensional integer coordinates, for a lattice L (a discrete subgroup of $R^n$) with d less than or equal to n, the LLL lattice basis reduction algorithm may calculate an LLL reduced lattice basis in time based on $O(d^5 n \log^3 B)$ where B is the largest length of $b_i$ under the Euclidean norm. In certain aspects, a matrix T can be determined such that T, $T^{-1} \in Z_{space}$ ≡ Complex Integer and ConditionNumber ($\tilde{H}$) ≥ ConditionNumber (H).

For example, as discussed further herein, a network entity (e.g., BS 102) may determine a matrix T for a communications channel and send the matrix T to UE 104. In certain aspects, the network entity performs a channel estimate procedure to determine (e.g., estimate) H for a communications channel. In one example, the network entity receives one or more reference signals (e.g., SRS) from UE 104 over the communications channel and estimates H based on measurement of the one or more reference signals. In another example, the network entity transmits one or more reference signals to UE 104 over the communications channel, UE 104 measures the one or more reference signals on the communication channel, and UE 104 sends a channel feedback report indicating measurements of the one or more reference signals on the communication channel to the network entity. The network entity may estimate H based on the channel feedback report. The network entity may then calculate the matrix T from H.

In certain aspects, LR component 510 is configured to use a matrix T to process the received signal $\vec{y}$ for LR transformation. For example, LR component 510 may be configured to determine the symbols of x at the transformed Z domain: $\vec{z}=(T^{-1}\vec{x})$ and then transform back to the X domain (e.g., after one or more hard decisions as performed in the Z domain). In certain aspects, such as if a decision error is detected, PSRD component 515 is configured to process one or more portions of the received signal $\vec{y}$ to determine one or more of the symbols of x.

Aspects Related to Lattice Reduction Matrix Communication

As discussed, certain aspects herein provide techniques for calculation of LR transformation matrices to be offloaded from a UE. In certain aspects, a network entity (e.g., a BS) is configured to calculate one or more LR transformation matrices for a UE, as discussed, and transmit the one or more LR transformation matrices to the UE. The UE, as discussed, is configured to utilize the one or more LR transformation matrices to perform demodulation.

Figure 6:
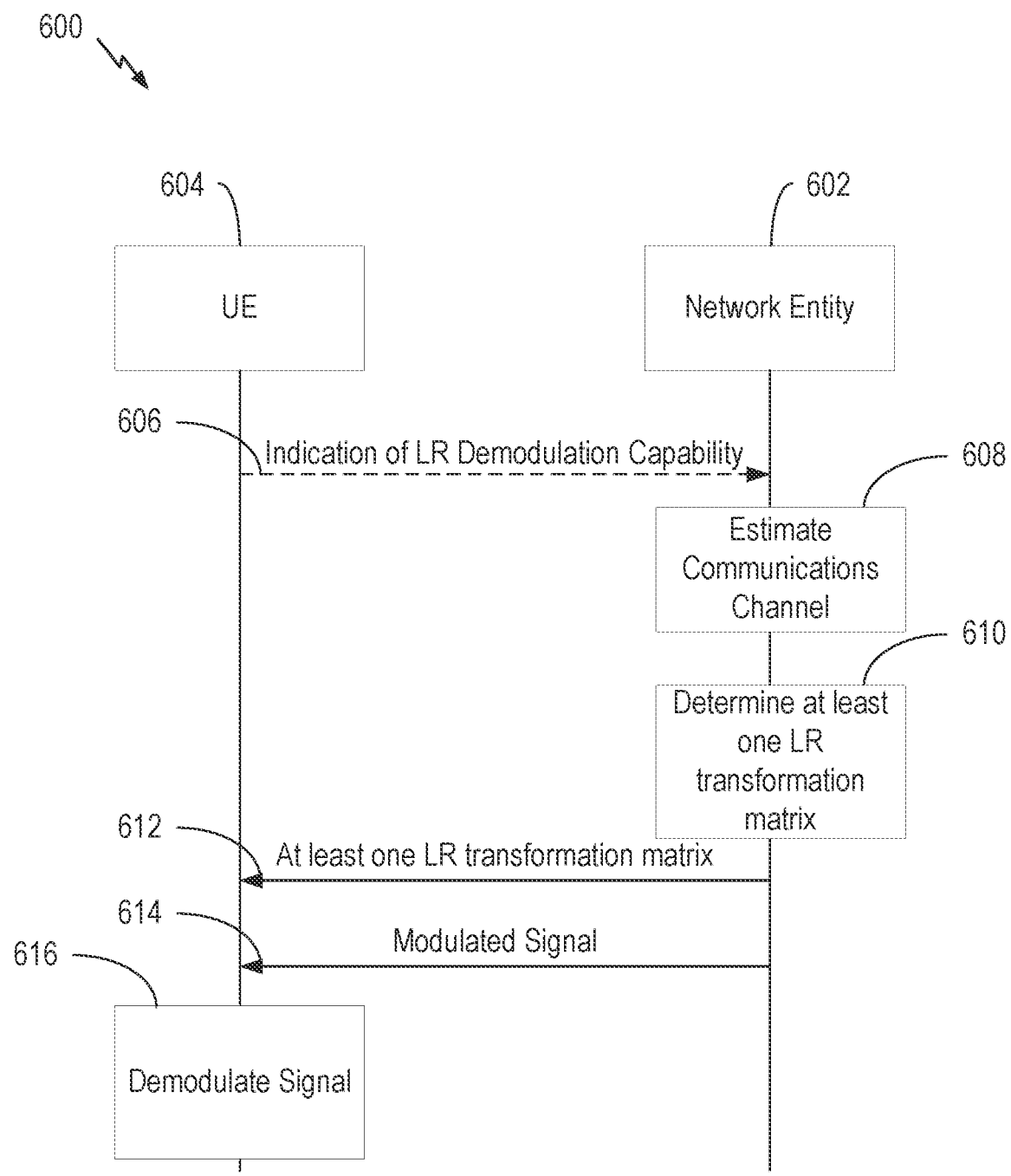
FIG. 6 depicts a process flow for communications in a network between a network entity and a UE.

FIG. 6 depicts a process flow 600 for communications in a network between a network entity 602 and a user equipment (UE) 604. In some aspects, the network entity 602 may be an example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 604 may be another type of wireless communications device and network entity 602 may be another type of network entity or network node, such as those described herein.

Optionally, at 606, UE 604 sends to network entity 602 an indication that UE 604 is capable of supporting LR demodulation. For example, network entity 602 may only be configured to calculate LR transformation matrices for UE 604 if UE 604 is capable of supporting LR demodulation. In certain aspects, UE 604 sends the indication prior to establishing an RRC connection, such as with the network entity 602.

Continuing, at 608, network entity 602 determines an estimate of a communications channel of UE 604, such as a communications channel between UE 604 and network entity 602. For example, UE 604 may transmit one or more reference signals (e.g., SRS) in the communications channel. The network entity 602 may measure the reference signal(s) to determine a channel estimate for the communications channel. In certain aspects, the network entity 602 and UE 604 are configured to use TDD to communicate in the communications channel, such that UL communication and DL communications between the network entity 602 and UE 604 are in the same frequency range. Accordingly, the network entity 602 can measure UL signals to estimate the DL to the UE 604.

In another example, network entity 602 (or another device) transmits one or more reference signals to UE 604. UE 604 measures the reference signal(s) to determine a channel estimate for the communications channel, and sends a channel feedback report to network entity 602 indicating the channel estimate for the communications channel.

Further, at 610, network entity 602 calculates at least one LR transformation matrix based on the channel estimate determined at 608, as discussed.

In certain aspects, network entity 602 calculates multiple LR transformation matrices, each LR transformation matrix applicable to a particular frequency range. For example, in certain aspects, the communications channel for which the channel estimate is determined at 608 may span a total frequency range. The total frequency range may be divided into a plurality of frequency ranges. The network entity 602 may calculate a separate LR transformation matrix for each of the plurality of frequency ranges based on the channel estimate (e.g., the matrix H). For example, the total frequency range may span 256 RBs. The total frequency range may be divided into a plurality of frequency ranges, each of the plurality of frequency ranges spanning a frequency granularity (e.g., 1, 2, 4, 8, 16, 32, 64, 128 RBs). For example, where the frequency granularity is 64 RBs, and the total frequency range spans RBs having index values 0-255, the total frequency range may be divided into 256/64=4 frequency ranges: 1) RBs 0-63; 2) RBs 64-127; 3) RBs 128-191; and 4) RBs 192-255. In certain aspects, the network entity 602 calculates an LR transformation matrix for each of the four frequency ranges.

In certain aspects, instead of calculating separate LR transformation matrices for different frequency ranges based on a single channel estimate, network entity 602 is configured to determine a different channel estimate for each of the different frequency ranges, and use the corresponding channel estimate of a given frequency range to calculate the LR transformation matrix for the given frequency range. For example, 608 may be performed for each frequency range, such as wherein the reference signal(s) for each channel estimate are communicated in the corresponding frequency range.

Continuing, at 612, network entity 602 sends the at least one LR transformation matrix to UE 604. In certain aspects, the network entity 602 sends the at least one LR transformation matrix to UE 604 in a downlink control information (DCI) message.

In certain aspects, where the at least one LR transformation matrix includes multiple LR transformation matrices, the multiple LR transformation matrices are combined in the DCI message. In certain aspects, the multiple LR transformation matrices are combined though concatenating the LR transformation matrices. In certain aspects, the multiple LR matrices are concatenated in order of their corresponding frequency ranges (e.g., smallest to largest frequency range, largest to smallest frequency range, etc.). For example, continuing the example with a total frequency range spanning RBs having index values 0-255, and a frequency granularity of 64 RBs, the LR transformation matrices may be concatenated in the following order: 1) LR transformation matrix for RBs 0-63; 2) LR transformation matrix for RBs 64-127; 3) LR transformation matrix for RBs 128-191; and 4) LR transformation matrix for RBs 192-255.

In certain aspects, where the at least one LR transformation matrix includes multiple LR transformation matrices, the network entity 602 further sends to UE 604 an indication of the frequency range over which to use each of the multiple LR transformation matrices. In certain aspects the indication of the corresponding frequency range over which to use each of the multiple LR transformation matrices is sent in the DCI message with the multiple LR transformation matrices, or may be sent in a separate message.

In certain aspects, the indication of the corresponding frequency range over which to use each of the multiple LR transformation matrices is the frequency granularity. For example, the UE 604 may have information about the total frequency range, and therefore divide the total frequency range by the frequency granularity as discussed to obtain the frequency ranges in order of frequency. When the UE 604 receives multiple LR transformation matrices ordered by frequency, the UE 604 maps the multiple LR transformation matrices to the obtained frequency ranges in order of frequency. In certain aspects, a reserved value of the frequency granularity (e.g., infinity) indicates there is only one LR transformation matrix.

At 614, the network entity 602 sends one or more modulated signals to UE 604. At 616, UE 604 receives and demodulates the one or more modulated signals using the at least one LR transformation matrix received at 612, as discussed. For example, where there are multiple LR transformation matrices corresponding to different frequency ranges, the UE 604 uses the corresponding LR transformation matrix for modulated signals received on a given frequency range.

In certain aspects, the network entity 602 is configured to calculate updated LR transformation matrices for the UE 604, such as at different time periods. For example, channel conditions may change between network entity 602 and UE 604 over time. Accordingly, network entity 602 and UE 604 may perform blocks 608-612 at different time periods (e.g., periodically). In certain aspects, UE 604 is configured to use the updated LR transformation matrices after receiving them, instead of any previously received LR transformation matrices for the same channel/frequency range.

For example, UE 604 may receive first one or more LR transformation matrices from network entity 602 at a first time. UE 604 may use the first one or more LR transformation matrices to demodulate modulated signals received from network entity 602 after the first time, and before a second time where the UE 604 may receive second one or more LR transformation matrices (e.g., updated LR transformation matrices) from network entity 602. UE 604 may use the second one or more LR transformation matrices to demodulate modulated signals received from network entity 602 after the second time.

Example Operations

Figure 7:
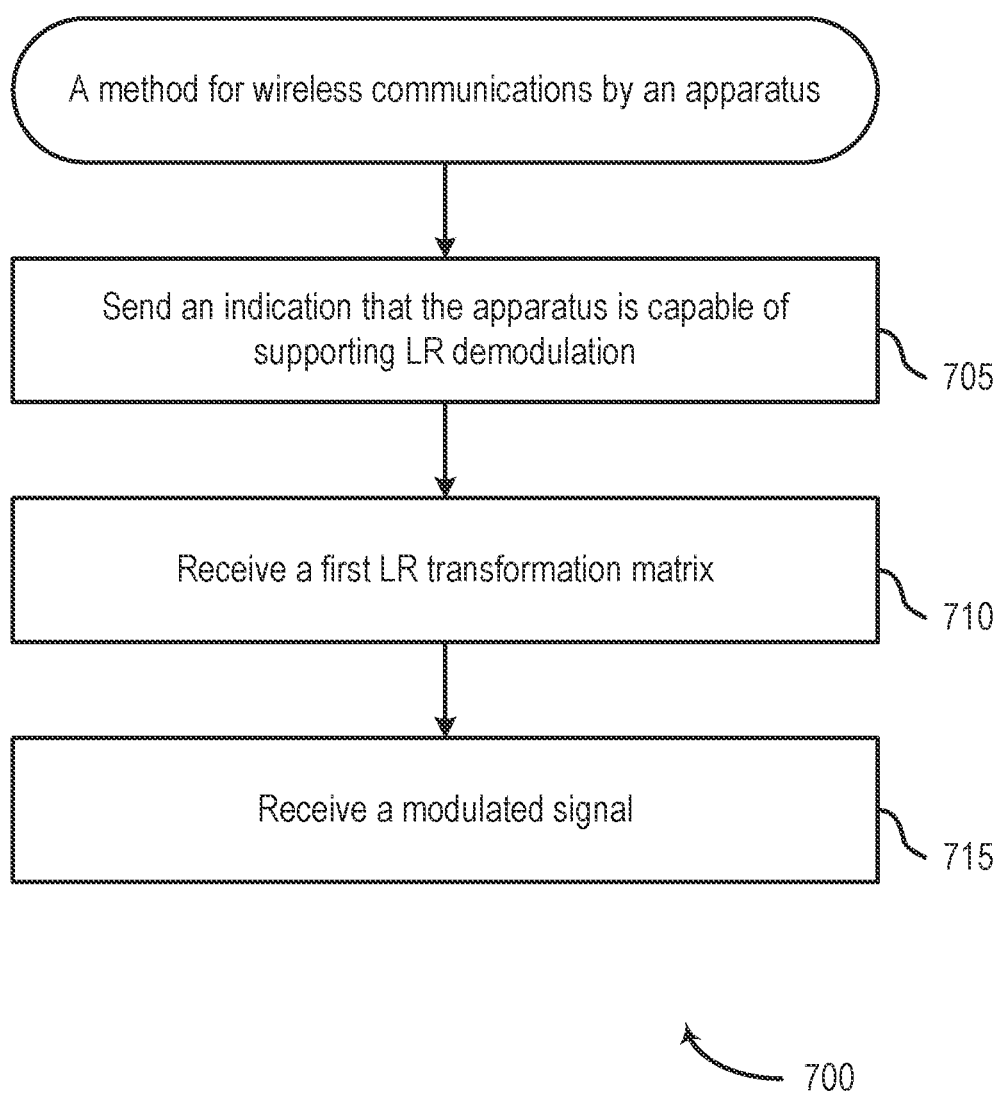
FIG. 7 depicts a method for wireless communications.

FIG. 7 shows a method 700 for wireless communications by an apparatus, such as UE 104 of FIGS. 1 and 3.

Method 700 begins at step 705 with sending an indication that the apparatus is capable of supporting LR demodulation.

Method 700 then proceeds to step 710 with receiving a first LR transformation matrix (to be used for demodulating a modulated signal).

Method 700 then proceeds to step 715 with receiving a modulated signal.

In one aspect, method 700 further includes demodulating the modulated signal using the first LR transformation matrix.

In one aspect, step 705 includes sending the indication that the apparatus is capable of supporting LR demodulation prior to completing a RRC connection with a network entity.

In one aspect, step 710 includes receiving a first plurality of LR transformation matrices including the first LR transformation matrix. In one aspect, the method 700 further includes receiving an indication of a corresponding frequency range over which to use each of the first plurality of LR transformation matrices for demodulation.

In one aspect, the indication of the corresponding frequency range over which to use each of the first plurality of LR transformation matrices for demodulation comprises an indication of a frequency granularity.

In one aspect, the apparatus receives the first plurality of LR transformation matrices concatenated together in order of corresponding frequency range.

In one aspect, method 700 further includes receiving a second LR transformation matrix after receiving the first LR transformation matrix.

In one aspect, method 700 further includes receiving a second modulated signal after receiving the second LR transformation matrix.

In one aspect, method 700 further includes demodulating the second modulated signal using the second LR transformation matrix.

In one aspect, method 700 further includes, after receiving the first LR transformation matrix, and before receiving the second LR transformation matrix, demodulating modulated signals, including the modulated signal, using the first LR transformation matrix.

In one aspect, method 700 further includes, after receiving the second LR transformation matrix, and before receiving a third LR transformation matrix, demodulating modulated signals, including the second modulated signal, using the second LR transformation matrix.

In one aspect, the apparatus comprises a UE, and wherein the UE sends the indication to a network entity, receives the first LR transformation matrix from the network entity, and receives the modulated signal from the network entity.

Figure 9:
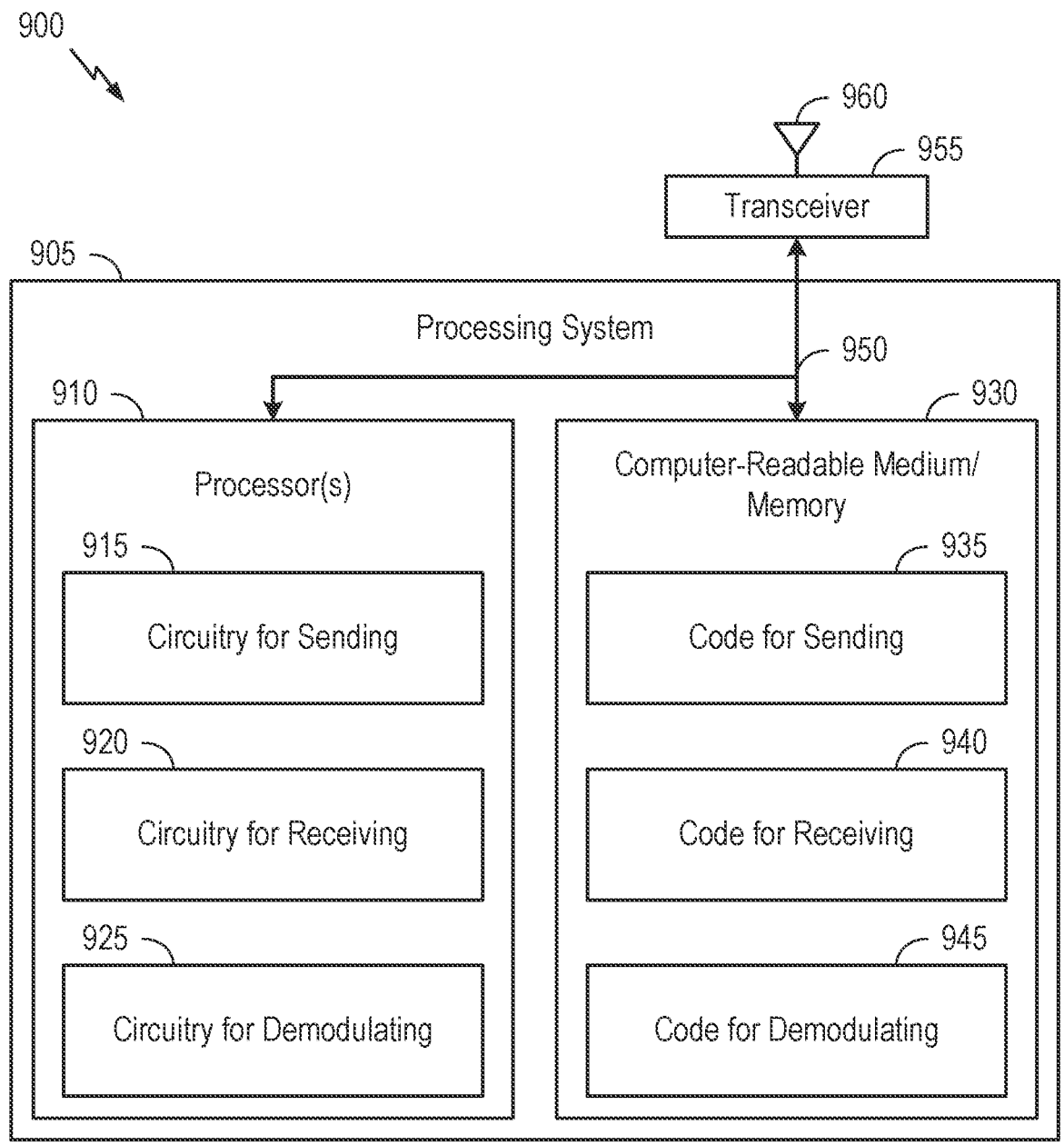
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Figure 8:
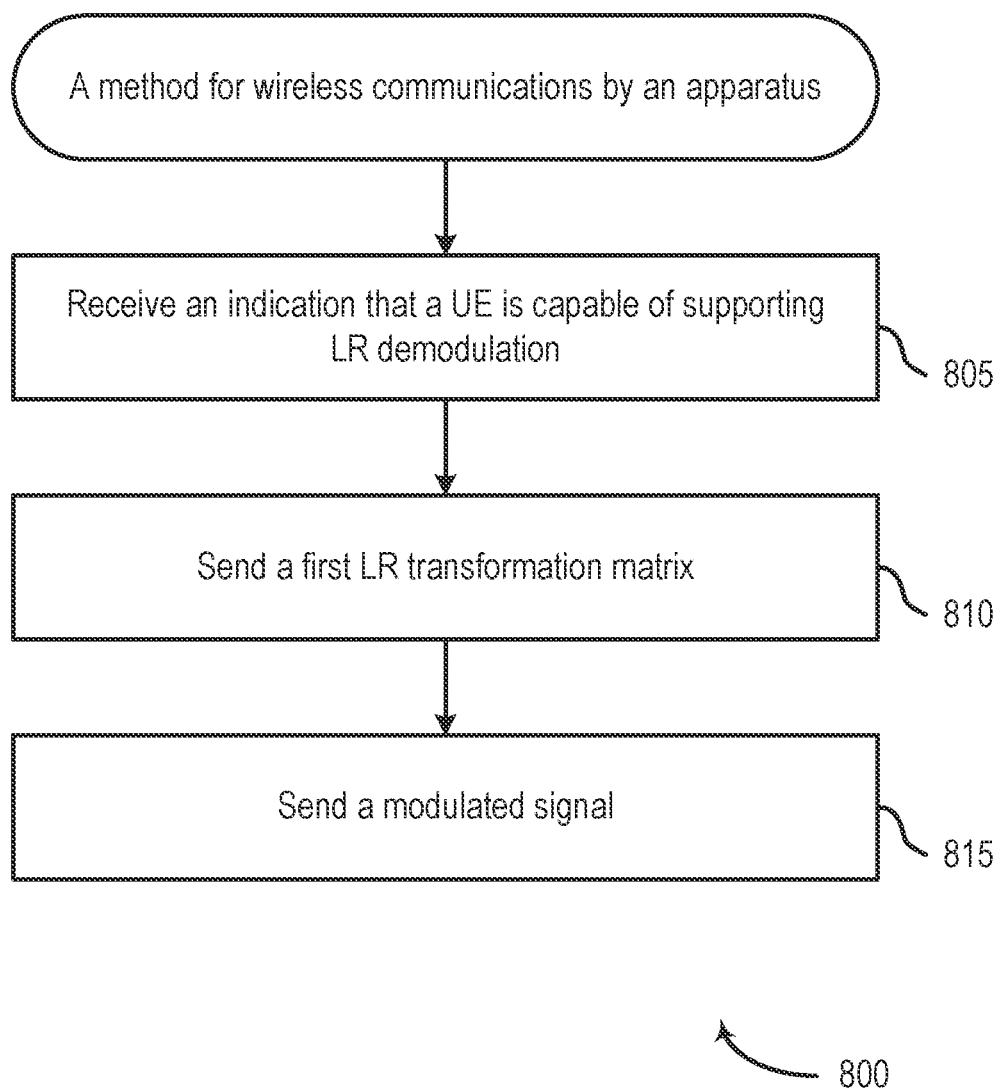
FIG. 8 depicts another method for wireless communications.

FIG. 8 shows a method 800 for wireless communications by an apparatus, such as BS 102 of FIGS. 1 and 3, or a disaggregated base station as discussed with respect to FIG. 2.

Method 800 begins at step 805 with receiving an indication that a UE is capable of supporting LR demodulation.

Method 800 then proceeds to step 810 with sending a first LR transformation matrix (to be used for demodulating a modulated signal).

Method 800 then proceeds to step 815 with sending a modulated signal.

In one aspect, method 800 further includes calculating the first LR transformation matrix based on a channel estimate between the UE and the apparatus.

In one aspect, method 800 further includes receiving a SRS.

In one aspect, method 800 further includes determining the channel estimate based on the SRS.

In one aspect, step 805 includes receiving the indication that the UE is capable of supporting LR demodulation prior to completing a RRC connection with the UE.

In one aspect, step 810 includes sending a first plurality of LR transformation matrices including the first LR transformation matrix. In one aspect, the method 800 further includes sending an indication of a corresponding frequency range over which to use each of the first plurality of LR transformation matrices for demodulation.

In one aspect, the indication of the corresponding frequency range over which to use each of the first plurality of LR transformation matrices for demodulation comprises an indication of a frequency granularity.

In one aspect, the apparatus sends the first plurality of LR transformation matrices concatenated together in order of corresponding frequency range.

In one aspect, method 800 further includes sending a second LR transformation matrix after sending the first LR transformation matrix.

In one aspect, method 800 further includes sending a second modulated signal after sending the second LR transformation matrix.

In one aspect, the apparatus comprises a network entity, and wherein the network entity receives the indication from the UE, sends the first LR transformation matrix to the UE, and sends the modulated signal to the UE.

Figure 10:
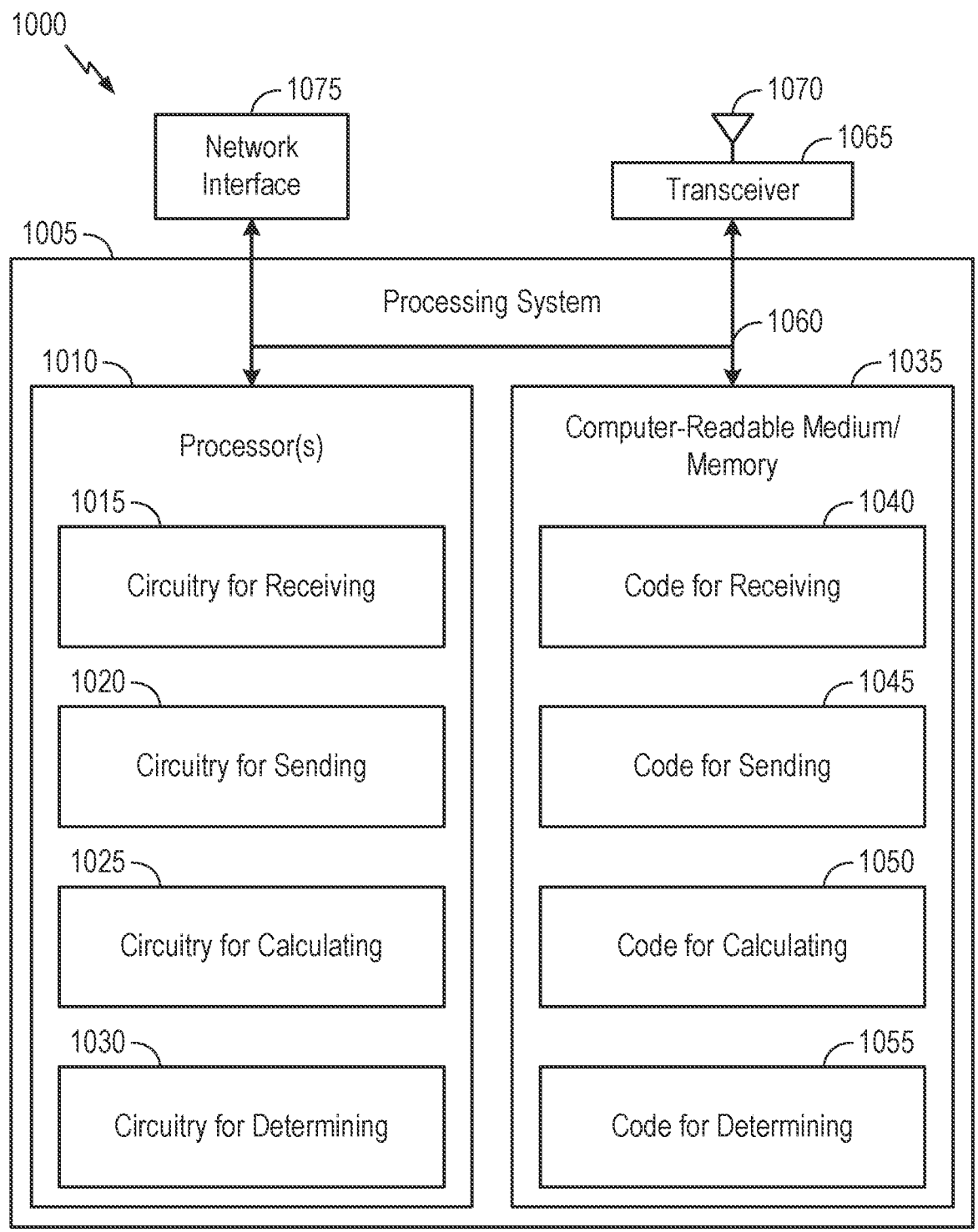
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 905 coupled to a transceiver 955 (e.g., a transmitter and/or a receiver). The transceiver 955 is configured to transmit and receive signals for the communications device 900 via an antenna 960, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. The one or more processors 910 are coupled to a computer-readable medium/memory 930 via a bus 950. In certain aspects, the computer-readable medium/memory 930 is configured to store instructions (e.g., computer-executable code) that when executed by the one or more processors 910, enable and cause the one or more processors 910 to perform the method 700 described with respect to FIG. 7, or any aspect related to it, including any additional steps or substeps described in relation to FIG. 7. Note that reference to a processor performing a function of communications device 900 may include one or more processors performing that function of communications device 900, such as in a distributed fashion.

In the depicted example, computer-readable medium/memory 930 stores code for sending 935, code for receiving 940, and code for demodulating 945. Processing of the code 935-945 may enable and cause the communications device 900 to perform the method 700 described with respect to FIG. 7, or any aspect related to it.

The one or more processors 910 include circuitry configured to implement (e.g., execute) the code stored in the computer-readable medium/memory 930, including circuitry for sending 915, circuitry for receiving 920, and circuitry for demodulating 925. Processing with circuitry 915-925 may enable and cause the communications device 900 to perform the method 700 described with respect to FIG. 7, or any aspect related to it.

More generally, means for communicating, transmitting, sending, modulating or outputting for transmission may include the transceivers 354, antenna(s) 352, transmit processor 364, TX MIMO processor 366, and/or controller/processor 380 of the UE 104 illustrated in FIG. 3, transceiver 955 and/or antenna 960 of the communications device 900 in FIG. 9, and/or one or more processors 910 of the communications device 900 in FIG. 9. Means for communicating, receiving, demodulating, or obtaining may include the transceivers 354, antenna(s) 352, receive processor 358, and/or controller/processor 380 of the UE 104 illustrated in FIG. 3, transceiver 955 and/or antenna 960 of the communications device 900 in FIG. 9, and/or one or more processors 910 of the communications device 900 in FIG. 9.

FIG. 10 depicts aspects of an example communications device 1000. In some aspects, communications device 1000 is a network entity, such as BS 102 of FIGS. 1 and 3, or a disaggregated base station as discussed with respect to FIG. 2.

The communications device 1000 includes a processing system 1005 coupled to a transceiver 1065 (e.g., a transmitter and/or a receiver) and/or a network interface 1075. The transceiver 1065 is configured to transmit and receive signals for the communications device 1000 via an antenna 1070, such as the various signals as described herein. The network interface 1075 is configured to obtain and send signals for the communications device 1000 via communications link(s), such as a backhaul link, midhaul link, and/or fronthaul link as described herein, such as with respect to FIG. 2. The processing system 1005 may be configured to perform processing functions for the communications device 1000, including processing signals received and/or to be transmitted by the communications device 1000.

The processing system 1005 includes one or more processors 1010. In various aspects, one or more processors 1010 may be representative of one or more of receive processor 338, transmit processor 320, TX MIMO processor 330, and/or controller/processor 340, as described with respect to FIG. 3. The one or more processors 1010 are coupled to a computer-readable medium/memory 1035 via a bus 1060. In certain aspects, the computer-readable medium/memory 1035 is configured to store instructions (e.g., computer-executable code) that when executed by the one or more processors 1010, enable and cause the one or more processors 1010 to perform the method 800 described with respect to FIG. 8, or any aspect related to it, including any additional steps or sub-steps described in relation to FIG. 8. Note that reference to a processor of communications device 1000 performing a function may include one or more processors of communications device 1000 performing that function, such as in a distributed fashion.

In the depicted example, the computer-readable medium/memory 1035 stores code for receiving 1040, code for sending 1045, code for calculating 1050, and code for determining 1055. Processing of the code 1040-1055 may enable and cause the communications device 1000 to perform the method 800 described with respect to FIG. 8, or any aspect related to it.

The one or more processors 1010 include circuitry configured to implement (e.g., execute) the code stored in the computer-readable medium/memory 1035, including circuitry for receiving 1015, circuitry for sending 1020, circuitry for calculating 1025, and circuitry for determining 1030. Processing with circuitry 1015-1030 may enable and cause the communications device 1000 to perform the method 800 described with respect to FIG. 8, or any aspect related to it.

More generally, means for communicating, transmitting, sending, modulating, or outputting for transmission may include the transceivers 332, antenna(s) 334, transmit processor 320, TX MIMO processor 330, and/or controller/processor 340 of the BS 102 illustrated in FIG. 3, transceiver 1065 and/or antenna 1070 of the communications device 1000 in FIG. 10, and/or one or more processors 1010 of the communications device 1000 in FIG. 10. Means for communicating, receiving, demodulating, or obtaining may include the transceivers 332, antenna(s) 334, receive processor 338, and/or controller/processor 340 of the BS 102 illustrated in FIG. 3, transceiver 1065 and/or antenna 1070 of the communications device 1000 in FIG. 10, and/or one or more processors 1010 of the communications device 1000 in FIG. 10.

Example Clauses

Implementation examples are described in the following numbered clauses:

Clause 1: A method for wireless communications by an apparatus comprising: sending an indication that the apparatus is capable of supporting LR demodulation; receiving a modulated signal; and receiving a first LR transformation matrix to be used for demodulating the modulated signal.

Clause 2: The method of Clause 1, further comprising: demodulating the modulated signal using the first LR transformation matrix.

Clause 3: The method of any one of Clauses 1-2, wherein sending the indication that the apparatus is capable of supporting LR demodulation comprises sending the indication that the apparatus is capable of supporting LR demodulation prior to completing a RRC connection with a network entity.

Clause 4: The method of any one of Clauses 1-3, wherein receiving the first LR transformation matrix comprises receiving a first plurality of LR transformation matrices including the first LR transformation matrix; and wherein the method further comprises: receiving an indication of a corresponding frequency range over which to use each of the first plurality of LR transformation matrices for demodulation.

Clause 5: The method of Clause 4, wherein the indication of the corresponding frequency range over which to use each of the first plurality of LR transformation matrices for demodulation comprises an indication of a frequency granularity.

Clause 6: The method of Clause 5, wherein the apparatus receives the first plurality of LR transformation matrices concatenated together in order of corresponding frequency range.

Clause 7: The method of any one of Clauses 1-6, further comprising: receiving a second LR transformation matrix after receiving the first LR transformation matrix; receiving a second modulated signal after receiving the second LR transformation matrix; and demodulating the second modulated signal using the second LR transformation matrix.

Clause 8: The method of Clause 7, further comprising: after receiving the first LR transformation matrix, and before receiving the second LR transformation matrix, demodulating modulated signals, including the modulated signal, using the first LR transformation matrix; and after receiving the second LR transformation matrix, and before receiving a third LR transformation matrix, demodulating modulated signals, including the second modulated signal, using the second LR transformation matrix.

Clause 9: The method of any one of Clauses 1-8, wherein the apparatus comprises a UE, and wherein the UE sends the indication to a network entity, receives the first LR transformation matrix from the network entity, and receives the modulated signal from the network entity.

Clause 10: A method for wireless communications by an apparatus comprising: receiving an indication that a UE is capable of supporting LR demodulation; sending a modulated signal; and sending a first LR transformation matrix to be used for demodulating the modulated signal.

Clause 11: The method of Clause 10, further comprising: calculating the first LR transformation matrix based on a channel estimate between the UE and the apparatus.

Clause 12: The method of Clause 11, further comprising: receiving an SRS; and determining the channel estimate based on the SRS.

Clause 13: The method of any one of Clauses 10-12, wherein receiving the indication that the UE is capable of supporting LR demodulation comprises receiving the indication that the UE is capable of supporting LR demodulation prior to completing a RRC connection with the UE.

Clause 14: The method of any one of Clauses 10-13, wherein sending the first LR transformation matrix comprises sending a first plurality of LR transformation matrices including the first LR transformation matrix; and wherein the method further comprises: sending an indication of a corresponding frequency range over which to use each of the first plurality of LR transformation matrices for demodulation.

Clause 15: The method of Clause 14, wherein the indication of the corresponding frequency range over which to use each of the first plurality of LR transformation matrices for demodulation comprises an indication of a frequency granularity.

Clause 16: The method of Clause 15, wherein the apparatus sends the first plurality of LR transformation matrices concatenated together in order of corresponding frequency range.

Clause 17: The method of any one of Clauses 10-16, further comprising: sending a second LR transformation matrix after sending the first LR transformation matrix; and sending a second modulated signal after sending the second LR transformation matrix.

Clause 18: The method of any one of Clauses 10-17, wherein the apparatus comprises a network entity, and wherein the network entity receives the indication from the UE, sends the first LR transformation matrix to the UE, and sends the modulated signal to the UE.

Clause 19: One or more apparatuses, comprising: one or more memories comprising executable instructions; and one or more processors configured to execute the executable instructions and cause the one or more apparatuses to perform a method in accordance with any one of clauses 1-18.

Clause 20: One or more apparatuses, comprising means for performing a method in accordance with any one of clauses 1-18.

Clause 21: One or more non-transitory computer-readable media comprising executable instructions that, when executed by one or more processors of one or more apparatuses, cause the one or more apparatuses to perform a method in accordance with any one of clauses 1-18.

Clause 22: One or more computer program products embodied on one or more computer-readable storage media comprising code for performing a method in accordance with any one of clauses 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus configured for wireless communications, comprising:
   one or more memories comprising processor-executable instructions; and
   one or more processors configured to execute the processor-executable instructions and cause the apparatus to:
   send an indication that the apparatus is capable of supporting lattice reduction (LR) demodulation;
   receive a modulated signal; and
   receive a first LR transformation matrix to be used for demodulating the modulated signal.

2. The apparatus of claim 1, wherein the one or more processors are configured to execute the processor-executable instructions and further cause the apparatus to:
   demodulate the modulated signal using the first LR transformation matrix.

3. The apparatus of claim 1, wherein to send the indication that the apparatus is capable of supporting LR demodulation, the one or more processors are configured to execute the processor-executable instructions and cause the apparatus to:
   send the indication that the apparatus is capable of supporting LR demodulation prior to completing a radio resource control (RRC) connection with a network entity.

4. The apparatus of claim 1, wherein, to receive the first LR transformation matrix, the one or more processors are configured to execute the processor-executable instructions and cause the apparatus to receive a first plurality of LR transformation matrices including the first LR transformation matrix, and wherein the one or more processors are configured to execute the processor-executable instructions and further cause the apparatus to:
   receive an indication of a corresponding frequency range over which to use each of the first plurality of LR transformation matrices for demodulation.

5. The apparatus of claim 4, wherein the indication of the corresponding frequency range over which to use each of the first plurality of LR transformation matrices for demodulation comprises an indication of a frequency granularity.

6. The apparatus of claim 5, wherein the apparatus receives the first plurality of LR transformation matrices concatenated together in order of corresponding frequency range.

7. The apparatus of claim 1, wherein the one or more processors are configured to execute the processor-executable instructions and further cause the apparatus to:
   receive a second LR transformation matrix after receiving the first LR transformation matrix;
   receive a second modulated signal after receiving the second LR transformation matrix; and
   demodulate the second modulated signal using the second LR transformation matrix.

8. The apparatus of claim 7, wherein the one or more processors are configured to execute the processor-executable instructions and further cause the apparatus to:
   after receiving the first LR transformation matrix, and before receiving the second LR transformation matrix, demodulate modulated signals, including the modulated signal, using the first LR transformation matrix; and
   after receiving the second LR transformation matrix, and before receiving a third LR transformation matrix, demodulate modulated signals, including the second modulated signal, using the second LR transformation matrix.

9. The apparatus of claim 1, wherein the apparatus comprises a user equipment (UE), and wherein the UE sends the indication to a network entity, receives the first LR transformation matrix from the network entity, and receives the modulated signal from the network entity.

10. An apparatus configured for wireless communications, comprising: one or more memories comprising processor-executable instructions; and one or more processors configured to execute the processor-executable instructions and cause the apparatus to:
    receive an indication that a user equipment (UE) is capable of supporting lattice reduction (LR) demodulation;
    send a modulated signal; and
    send a first LR transformation matrix to be used for demodulating the modulated signal.

11. The apparatus of claim 10, wherein the one or more processors are configured to execute the processor-executable instructions and further cause the apparatus to:
    calculate the first LR transformation matrix based on a channel estimate between the UE and the apparatus.

12. The apparatus of claim 11, wherein the one or more processors are configured to execute the processor-executable instructions and further cause the apparatus to:
    receive a sounding reference signal (SRS); and
    determine the channel estimate based on the SRS.

13. The apparatus of claim 10, wherein to receive the indication that the UE is capable of supporting LR demodulation, the one or more processors are configured to execute the processor-executable instructions and cause the apparatus to:
    receive the indication that the UE is capable of supporting LR demodulation prior to completing a radio resource control (RRC) connection with the UE.

14. The apparatus of claim 10, wherein, to send the first LR transformation matrix, the one or more processors are configured to execute the processor-executable instructions and cause the apparatus to send a first plurality of LR transformation matrices including the first LR transformation matrix, and wherein the one or more processors are configured to execute the processor-executable instructions and further cause the apparatus to:
    send an indication of a corresponding frequency range over which to use each of the first plurality of LR transformation matrices for demodulation.

15. The apparatus of claim 14, wherein the indication of the corresponding frequency range over which to use each of the first plurality of LR transformation matrices for demodulation comprises an indication of a frequency granularity.

16. The apparatus of claim 15, wherein the apparatus sends the first plurality of LR transformation matrices concatenated together in order of corresponding frequency range.

17. The apparatus of claim 10, wherein the one or more processors are configured to execute the processor-executable instructions and further cause the apparatus to:
send a second LR transformation matrix after sending the first LR transformation matrix; and
send a second modulated signal after sending the second LR transformation matrix.

18. The apparatus of claim 10, wherein the apparatus comprises a network entity, and wherein the network entity receives the indication from the UE, sends the first LR transformation matrix to the UE, and sends the modulated signal to the UE.

19. A method for wireless communications by an apparatus, the method comprising:
sending an indication that the apparatus is capable of supporting lattice reduction (LR) demodulation;
receiving a modulated signal; and
receiving a first LR transformation matrix to be used for demodulating the modulated signal.

20. The method of claim 19, further comprising:
demodulating the modulated signal using the first LR transformation matrix.

21. The method of claim 19, wherein sending the indication that the apparatus is capable of supporting LR demodulation comprises:
sending the indication that the apparatus is capable of supporting LR demodulation prior to completing a radio resource control (RRC) connection with a network entity.

22. The method of claim 19, wherein receiving the first LR transformation matrix comprises receiving a first plurality of LR transformation matrices including the first LR transformation matrix; and wherein the method further comprises:
receiving an indication of a corresponding frequency range over which to use each of the first plurality of LR transformation matrices for demodulation.

23. The method of claim 19, further comprising:
receiving a second LR transformation matrix after receiving the first LR transformation matrix;
receiving a second modulated signal after receiving the second LR transformation matrix; and
demodulating the second modulated signal using the second LR transformation matrix.

24. The method of claim 19, wherein the apparatus comprises a UE, and wherein the UE sends the indication to a network entity, receives the first LR transformation matrix from the network entity, and receives the modulated signal from the network entity.

25. A method for wireless communications by an apparatus, the method comprising:
receiving an indication that a user equipment (UE) is capable of supporting lattice reduction (LR) demodulation;
sending a modulated signal; and
sending a first LR transformation matrix to be used for demodulating the modulated signal.

26. The method of claim 25, further comprising:
calculating the first LR transformation matrix based on a channel estimate between the UE and the apparatus.

27. The method of claim 25, wherein receiving the indication that the UE is capable of supporting LR demodulation comprises:
receiving the indication that the UE is capable of supporting LR demodulation prior to completing a radio resource control (RRC) connection with the UE.

28. The method of claim 25, wherein sending the first LR transformation matrix comprises sending a first plurality of LR transformation matrices including the first LR transformation matrix; and wherein the method further comprises:
sending an indication of a corresponding frequency range over which to use each of the first plurality of LR transformation matrices for demodulation.

29. The method of claim 25, further comprising:
sending a second LR transformation matrix after sending the first LR transformation matrix; and
sending a second modulated signal after sending the second LR transformation matrix.

30. The method of claim 25, wherein the apparatus comprises a network entity, and wherein the network entity receives the indication from the UE, sends the first LR transformation matrix to the UE, and sends the modulated signal to the UE.

* * * * *